(12) United States Patent
Grave et al.

(10) Patent No.: US 10,112,848 B2
(45) Date of Patent: Oct. 30, 2018

(54) EMULSION EXTRACTION AND PROCESSING FROM AN OIL/WATER SEPARATOR

(71) Applicants: Edward J. Grave, Montgomery, TX (US); Michael D. Olson, The Woodlands, TX (US)

(72) Inventors: Edward J. Grave, Montgomery, TX (US); Michael D. Olson, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 381 days.

(21) Appl. No.: 14/821,232

(22) Filed: Aug. 7, 2015

(65) Prior Publication Data

US 2016/0052799 A1    Feb. 25, 2016

Related U.S. Application Data

(60) Provisional application No. 62/171,122, filed on Jun. 4, 2015, provisional application No. 62/041,509, filed on Aug. 25, 2014.

(51) Int. Cl.
*C02F 1/38* (2006.01)
*B01D 17/038* (2006.01)
(Continued)

(52) U.S. Cl.
CPC ............ *C02F 1/38* (2013.01); *B01D 17/0214* (2013.01); *B01D 17/0217* (2013.01);
(Continued)

(58) Field of Classification Search
CPC .... C02F 1/38; C02F 2103/36; C02F 2101/32; B01D 17/0217; B01D 17/12;
(Continued)

(56) References Cited

U.S. PATENT DOCUMENTS

| 5,498,346 A | 3/1996 | Hadfield et al. ............... 210/739 |
| 5,772,901 A | 6/1998 | Yu et al. ....................... 210/896 |

(Continued)

FOREIGN PATENT DOCUMENTS

| CA | 2086320 | 11/1992 | ............ B01D 17/38 |
| DE | 4312725 C1 * | 3/1994 | ............ B01D 17/04 |

(Continued)

OTHER PUBLICATIONS

English language machine translation of DE 4312725 C1, retrieved Jan. 24, 2018, pp. 1-7. (Year: 1994).*

*Primary Examiner* — David C Mellon
(74) *Attorney, Agent, or Firm* — ExxonMobil Upstream Research Company Law Department

(57) ABSTRACT

A method of emulsion extraction and processing from an oil/water separator, comprising detecting an emulsion parameter, passing an emulsion stream out of the separator, combining the emulsion stream with a water stream exiting the separator to create a diluted emulsion, dynamically adjusting a dilution of the diluted emulsion based at least in part on the emulsion parameter, and separating the diluted emulsion into an underflow stream comprising substantially water and a reject stream comprising substantially oil.

4 Claims, 5 Drawing Sheets

(51) Int. Cl.
*C10G 33/08* (2006.01)
*C10G 33/06* (2006.01)
*B01D 17/12* (2006.01)
*B01D 17/04* (2006.01)
*E21B 43/36* (2006.01)
*B01D 17/02* (2006.01)
*C02F 101/32* (2006.01)
*C02F 103/36* (2006.01)

(52) U.S. Cl.
CPC ........... *B01D 17/048* (2013.01); *B01D 17/12* (2013.01); *C10G 33/06* (2013.01); *C10G 33/08* (2013.01); *C02F 2101/32* (2013.01); *C02F 2103/36* (2013.01); *E21B 43/36* (2013.01)

(58) Field of Classification Search
CPC .. B01D 17/0214; B01D 17/048; C10G 33/08; C10G 33/06; E21B 43/36
See application file for complete search history.

(56) References Cited

U.S. PATENT DOCUMENTS

| | | | |
|---|---|---|---|
| 5,882,506 A | 3/1999 | Ohsol et al. | 208/188 |
| 2002/0033356 A1 | 3/2002 | Honda et al. | 208/251 |
| 2008/0116072 A1 | 5/2008 | Liverud et al. | 204/563 |
| 2012/0145642 A1* | 6/2012 | Bozak | B01D 17/0208 210/703 |
| 2013/0082005 A1* | 4/2013 | Sams | C02F 1/24 210/704 |
| 2013/0083620 A1 | 4/2013 | Hypes et al. | 366/136 |

FOREIGN PATENT DOCUMENTS

| | | | |
|---|---|---|---|
| WO | WO 1992/019347 | 11/1992 | B01D 17/038 |
| WO | WO 1992/019349 | 11/1992 | B01D 17/038 |
| WO | WO 2005/005012 | 1/2005 | B01D 19/00 |
| WO | 2013/048677 | 4/2013 | |

\* cited by examiner

EMULSION EXTRACTION AND PROCESSING FROM AN OIL/WATER SEPARATOR

CROSS REFERENCE TO RELATED APPLICATIONS

This application claims the priority benefit of both U.S. patent application Nos. 62/041,509 filed Aug. 25, 2014 entitled EMULSION EXTRACTION AND PROCESSING FROM AN OIL/WATER SEPARATOR, and 62/171,122 filed Jun. 4, 2015 entitled EMULSION EXTRACTION AND PROCESSING FROM AN OIL/WATER SEPARATOR, the entirety of which is incorporated by reference herein.

BACKGROUND

Demand for oil and gas reserves has increased over the past several decades due to steady population growth and the industrialization of new markets. At the same time, conventional fields are maturing and experiencing a decrease in oil and gas production as reservoir pressures drop and/or water production increases. These economic factors, which effect the oil and gas industry, have led to recent developments and advances in exploration, drilling, and production technologies as companies try to either increase production from mature fields or bring new opportunities on-line. One technology area that has seen increased interest from oil and gas producers and vendors alike is subsea processing.

Subsea processing is not a new concept in the oil and gas industry; however, recent economic factors have led to far more applications ranging from simple single-phase or multiphase boosting and subsea separation and boosting to future gas compression projects. Vendors are trying to establish technologies that can meet the unique challenges of subsea processing, and producers are trying to stay ahead of the competition by developing, qualifying, and applying these new technologies.

Subsea processing may include subsea separation, which can be segregated into two-phase, gas-liquid separation and three-phase, gas-oil-water separation. Overall, subsea two-phase separation presents the following benefits: reduced back-pressure acting on the well leading to higher production rates (accelerated revenue) and recoverable reserves (total revenue): the ability to overcome long step-out distances between field and host facility (fewer boosting stations required to reach host facility); reduced topsides infrastructure; the ability to absorb transient flow conditions such that gas-liquid slugs do not affect performance of downstream equipment (e.g., pumps and/or wet-gas compressor): lower energy requirements than multiphase boosting of full well-stream (higher efficiency of rotating equipment); and mitigation of certain flow assurance issues through bulk separation of gas and produced water phases (assuming two lines are installed back to host facility). Subsea three-phase, gas-oil-water separation may yield the following benefits related to the bulk removal of the produced water phase: the ability to debottleneck existing topsides water handling/treatment facilities; the ability to inject produced water into dedicated disposal well or back into the reservoir for pressure maintenance (lower energy requirements than platform- and/or land-based water injection); the ability to use smaller production lines back to host facility due to removal of non-revenue stream (e.g., produced water): and mitigation of certain flow assurance issues through bulk separation of oil and produced water streams. These benefits may make it desirable to develop a multiphase separation system to establish a technological advantage and earn partner or choice status for future subsea separation applications. An advancement of this nature may enable production of Arctic, deepwater, or other remote oil and gas fields for which production is not currently possible. Subsea separation may act as an enabler in these cases by, for example, removing bulk water from the production streams and mitigating flow assurance concerns for longer distance tieback applications.

One challenge with subsea three-phase separation is the formation of stable oil/water emulsion layers. Testing has shown that stable oil/water emulsion layers can significantly affect the quality of the oil and water outlets from the subsea separator. If separation of heavy oil (known to form stable emulsions) is desired, then oil/water separation may require longer residence times and lower fluid velocities. However, this approach may not be economic for offshore and subsea applications due to size, weight, and fabrication constraints. Designing a deepwater, oil-water separator with oil residence times of greater than about 3-5 minutes can be challenging. Analogous onshore separators may require about 10-15 minutes residence time. Therefore, decreasing the throughput of the subsea separation system may be required for heavy oil applications, which may bottleneck the oil/water separation process. Similarly, opportunities also exist on onshore and topsides separators that suffer from the formation of stable oil/water emulsions. In conventional applications, production chemicals such as demulsifiers and/or heat may be applied to alter the interfacial tension and destabilize the oil/water emulsion. In subsea applications, heat may not be a cost effective option or, in some cases, may even be technically infeasible. Consequently, dosing with production chemicals is customarily preferred. However, dosing can have a significant effect on the capital and operating costs associated with a subsea installation.

The cost of developing and applying a subsea separation system may be significant and may become uneconomical if the system cannot provide sufficient production increases to offset the cost. Consequently, the design of subsea processing systems may include a balance between what is practically achievable under the vessel size constraints due to pressure and what production rate is required to make the project economical. Any technological advance aimed at enhancing the overall performance of the oil-water separation, which is often the bottleneck of such a system, could become the deciding economic factor of a future project. For this reason, extraction and processing of the stable oil/water emulsion layer from a subsea separator may prove beneficial.

Injectability of the produced water stream may also affect the successful operation, and therefore economics, of subsea separation installations that employ oil-water separation. Therefore, the removal of oil contamination, which can have a significant effect on injectability of the water stream, may be important. It may be advisable to provide monitoring and/or frequent sampling of the produced water quality in order to avoid future issues with the injection reservoir. These aspects may be particularly important when injecting back into the production reservoir for pressure maintenance as plugging and/or permeability issues in the perforated zone could lead to an inability to inject the produced water and/or result in other production issues.

SUMMARY

One embodiment includes a method of emulsion extraction and processing from an oil/water separator, comprising detecting an emulsion parameter, passing an emulsion stream out of the separator, combining the emulsion stream with a water stream exiting the separator to create a diluted emulsion, dynamically adjusting a dilution of the diluted emulsion based at least in part on the emulsion parameter and separating the diluted emulsion into an underflow stream comprising substantially water and a reject stream comprising substantially oil.

Another embodiment includes a system for emulsion extraction and processing from an oil/water separator, comprising an oil/water separator having a water outlet, an oil outlet, and an emulsion outlet a detection instrument operatively coupled to the oil/water separator, the emulsion outlet, or a component downstream of the emulsion outlet, a mixing leg, wherein the mixing leg is coupled to the water outlet and the emulsion outlet, at least one control valve operatively coupled to piping for the water outlet, the emulsion outlet, or both, and a separation device coupled to the mixing leg and having an oil reject outlet and a water underflow outlet.

Still another embodiment includes a method of emulsion extraction and processing from a subsea oil/water separator, comprising detecting an emulsion level in the subsea separator, detecting a composition of an emulsion stream leaving the subsea separator, or detecting the composition of the emulsion stream downstream of the subsea separator, passing the emulsion stream to a preparation volume, creating a prepared emulsion stream, combining the prepared emulsion flow with a water stream to create a diluted emulsion, dynamically adjusting a dilution of the diluted emulsion by adding comparatively more or less of the water stream to the emulsion stream or vice versa, and wherein the dilution is controlled at least in part based on the emulsion level in the subsea separator or the composition of the emulsion stream, and separating the diluted emulsion into a water underflow stream comprising substantially water and a reject stream comprising substantially oil.

BRIEF DESCRIPTION OF THE DRAWINGS

The advantages of the present techniques are better understood by referring to the following detailed description and the attached drawings, in which.

DETAILED DESCRIPTION

Figure 1:
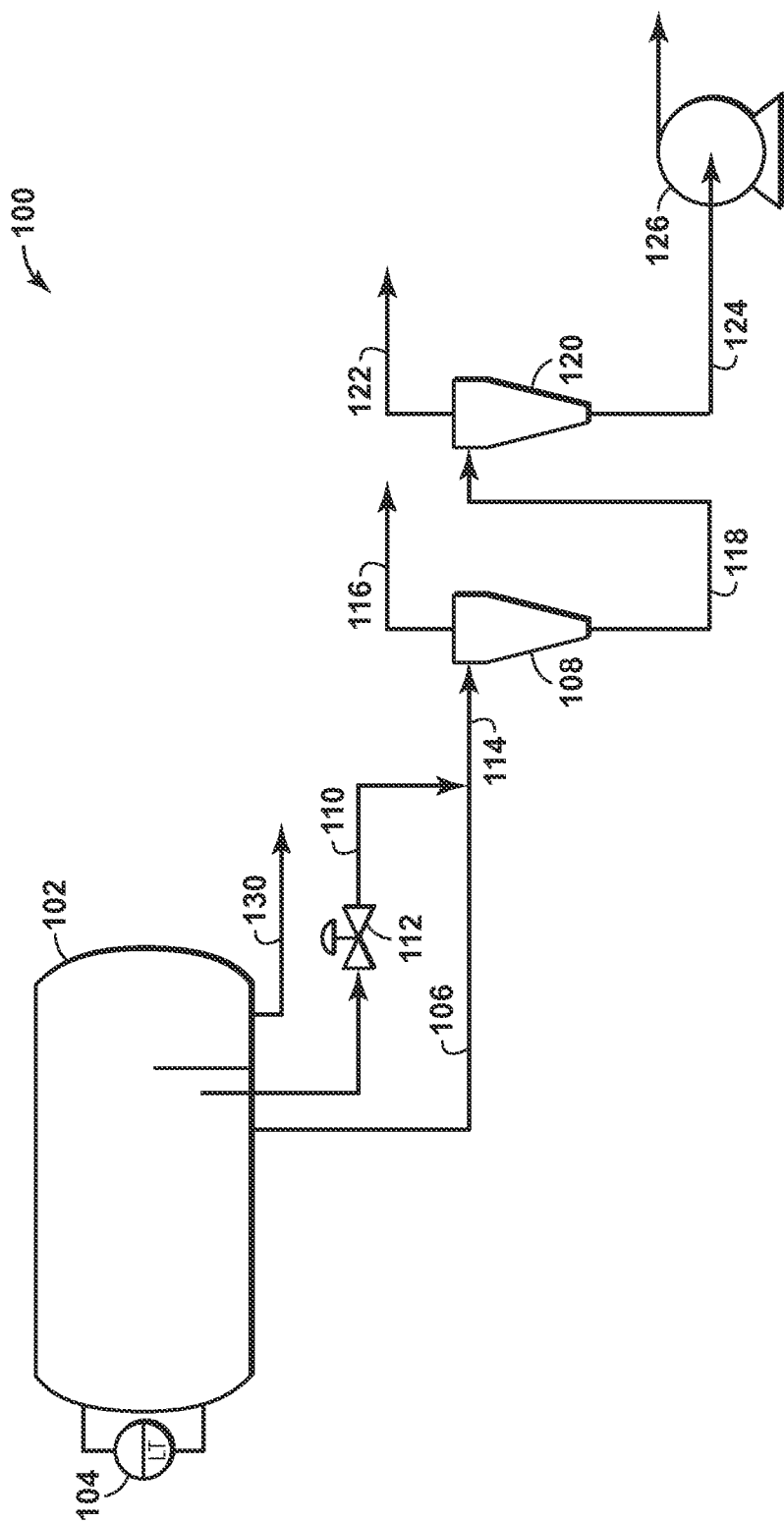
FIG. 1 is a schematic diagram of an embodiment of a system for emulsion extraction and processing from an oil/water separator.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

This disclosure comprises techniques to perform emulsion extraction and processing. The techniques described herein may be particularly suitable for subsea processing applications, where high-reliability, comparatively simple and/or compact systems may be particularly desirable. Using the techniques of this disclosure, initial separation and processing of hydrocarbons from an emulsion may be suitably performed in a variety of environments, e.g., subsea separation. Disclosed techniques include utilizing separated water from an oil/water separator to assist in the destabilization and separation of an emulsion withdrawn from the same separator. A control valve may be utilized to control one or more variables, e.g., the dilution ratio of the emulsion. When the disclosed techniques include using the comparatively high-efficiency hydrocyclones for separation, the disclosed techniques may enable shorter residence times for separation and/or reduce the bottlenecks in the oil/water separation process. Use of the disclosed techniques may reduce the dependence on complete separation occurring within the separator, thereby increasing throughput of the subsea separation system. Use of the disclosed techniques may be particularly suitable for subsea usage, where high reliability and a low number of moving components may be important to effectiveness. Further, subsea separation using the disclosed techniques may act as an enabler in these cases by, for example, removing bulk water from the exported production streams and mitigating flow assurance concerns for longer distance tieback applications.

At the outset, for ease of reference, certain terms used in this application and their meanings as used in this context are set forth. To the extent a term used herein is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

As used herein, the term "emulsion" refers to a mixture of two immiscible liquids, where droplets of a first liquid are dispersed in a second liquid where it does not dissolve. The particles or droplets may be on a micron scale, or smaller. The dispersed liquid is said to form the dispersed phase, while the other liquid is said to form the continuous phase.

As used herein, the phrase "emulsion stability" refers to the degree to which an emulsion retains its internal phase as droplets homogeneously distributed when the emulsion is stressed, for example by passing the emulsion through porous media, aging the emulsion, heating the emulsion, or contacting the emulsion with a fluid of differing salinity or pH or with surface active chemicals.

As used herein, the term "hydrocyclone" refers to a cyclone that effects separation of materials of differing densities and/or specific gravities by centrifugal forces. For example, a "bulk deoiling hydrocyclone" refers to a cyclone that uses centrifugal forces to separate a high oil-in-water concentration stream and recover the majority of the oil contents in the reject stream. A "polishing hydrocyclone" refers to a cyclone that uses centrifugal forces to recover small oil droplets from a low oil-in-water concentration stream, e.g., the underflow (water outlet) of the bulk de-oiling hydrocylones, in the reject stream.

As used herein, the terms "substantial" or "substantially" refer to a relative amount of a material or characteristic that is sufficient to provide the intended effect or express the stated characteristics. The exact degree of deviation allowable in some cases may depend on the specific context, but even in view of any deviation will express largely but not wholly that which is specified. For example, the use of the terms "substantial" or "substantially" means±10% of the subsequent number if a number is specified, unless otherwise stated. In contexts where numerical measurements are not taken, the use of the terms "substantial" or "substantially" means generally the same or uniform but allowing for or having fluctuations from a defined property, definition, composition, etc. For example, some minor measurable or immeasurable fluctuations and/or variations in a measured property described herein, such as viscosity, melting point, composition, etc., may be unintentionally incorporated due to human error or methodology precision. Other fluctuations and/or variations may result from inherent variations in the industrial process, environmental deviations, and the like. While containing such fluctuations, those of skill in the art would nevertheless understand the property, definition, composition, etc. to substantially possess the property, definition, composition, etc. as reported.

As used herein, the phrase "vice versa" means in reverse order from the way something has been stated.

While for purposes of simplicity of explanation the illustrated methodologies show and describe a series of blocks, the methodologies are not limited by the order of the blocks, as some blocks can occur in different orders and/or concurrently with other blocks from that shown and described. Moreover, less than all the illustrated blocks may be required to implement an example methodology, and certain blocks may be combined or separated into multiple components. Furthermore, additional and/or alternative methodologies can employ additional, not illustrated blocks. While the figures illustrate various serially occurring actions, various actions could occur concurrently, in parallel, and/or at substantially different points in time.

FIG. 1 is a schematic diagram of an embodiment of a system 100 for emulsion extraction and processing from an oil/water separator 102, e.g., a subsea oil/water separator, having a detector 104, e.g., a level detector, positioned or disposed thereon. It will be appreciated that various detectors and/or detector mounting locations are readily available and may be optionally selected within the scope of this disclosure. For example, an oil-in-water (OiW) concentration monitor, an in-situ water-cut meter, or other device may be suitably employed at the separator outlet or further downstream in the system, e.g., downstream of the blend point between the water outlet line 106 and the emulsion outlet line 110. The system 100 comprises a water outlet line 106 for passing a stream comprising substantially water or water flow from the separator 102 to a first separation device 108, e.g., a hydrocyclone. The system 100 comprises an emulsion outlet line 110 for passing a stream of emulsion or emulsion flow from the separator 102 to the separation device 108. While depicted as a singular outlet line, those of skill in the art will appreciate that multiple outlet lines and/or nozzles located at different heights may alternately or additionally be employed to isolate and extract the emulsion layer. A control valve 112 is positioned or disposed on the emulsion outlet line 110 for controlling the amount of emulsion flowing through the emulsion outlet line 110. The control valve 112 may be controlled to maintain an emulsion level and/or a water level in the separator 102, e.g., using data received from the detector 104, or control valve 112 may be controlled to maintain an OiW concentration at the inlet to the separation device 108, e.g., using data received from the OiW monitor. The water outlet line 106 and the emulsion outlet line 110 combine in a mixing leg or preparation volume 114, which may be a simple pipe or tube as shown in FIG. 1 or may comprise additional components and/or volumes to facilitate mixing, prior to entering the first separation device 108. The first separation device 108 has two outputs, a reject stream outlet 116, e.g., for passing a stream comprising substantially oil, and an underflow stream outlet 118, e.g., for passing a stream of underflow comprising substantially water. The system 100 comprises a second separation device 120, e.g., a polishing hydrocyclone, coupled to the underflow stream outlet 118 and having two outputs, a reject stream outlet 122, e.g., for passing a stream comprising substantially oil, and an underflow stream outlet 124, e.g., for passing a stream of underflow comprising substantially water. A pump 126, e.g., a water injection pump, is coupled to the underflow stream outlet 124 for discharging the fluid output from the second separation device 120 via the underflow stream outlet 124. The system 100 comprises an oil outlet line 130 for passing a stream comprising substantially oil or oil flow from the separator 102.

In operation, the system 100 may determine and/or monitor an emulsion parameter, e.g., an emulsion level in the separator 102 or a composition in an emulsion flow out of the separator, e.g., at the mixing leg or preparation volume 114, at the emulsion outlet, or along the emulsion outlet line 110. The system 100 may flow the emulsion stream or flow out of the separator through a control valve 112 to the first separation device 108. At the mixing leg or preparation volume 114, the emulsion flow may combine with a stream comprising substantially water or water flow carried by the water outlet line 106. Depending on the controlling parameter, e.g., emulsion or water level in the separator 102, emulsion flow composition, etc., the control valve 112 may dynamically adjust the dilution of the emulsion by adding comparatively more or comparatively less of the water flow to the emulsion flow, e.g., based at least in part on data received from the detector 104. The first separation device 108 may separate the received stream into an underflow stream comprising substantially water and a reject stream comprising substantially oil. The underflow stream comprising substantially water is then passed via the underflow stream outlet 118 to the second separation device 120 for further processing, namely, separating with the underflow stream into a second underflow stream comprising substantially water and a second reject stream comprising substantially oil. The second separation device 120 passes the second underflow stream to the pump 126 for discharge from the system 100.

Figure 2:
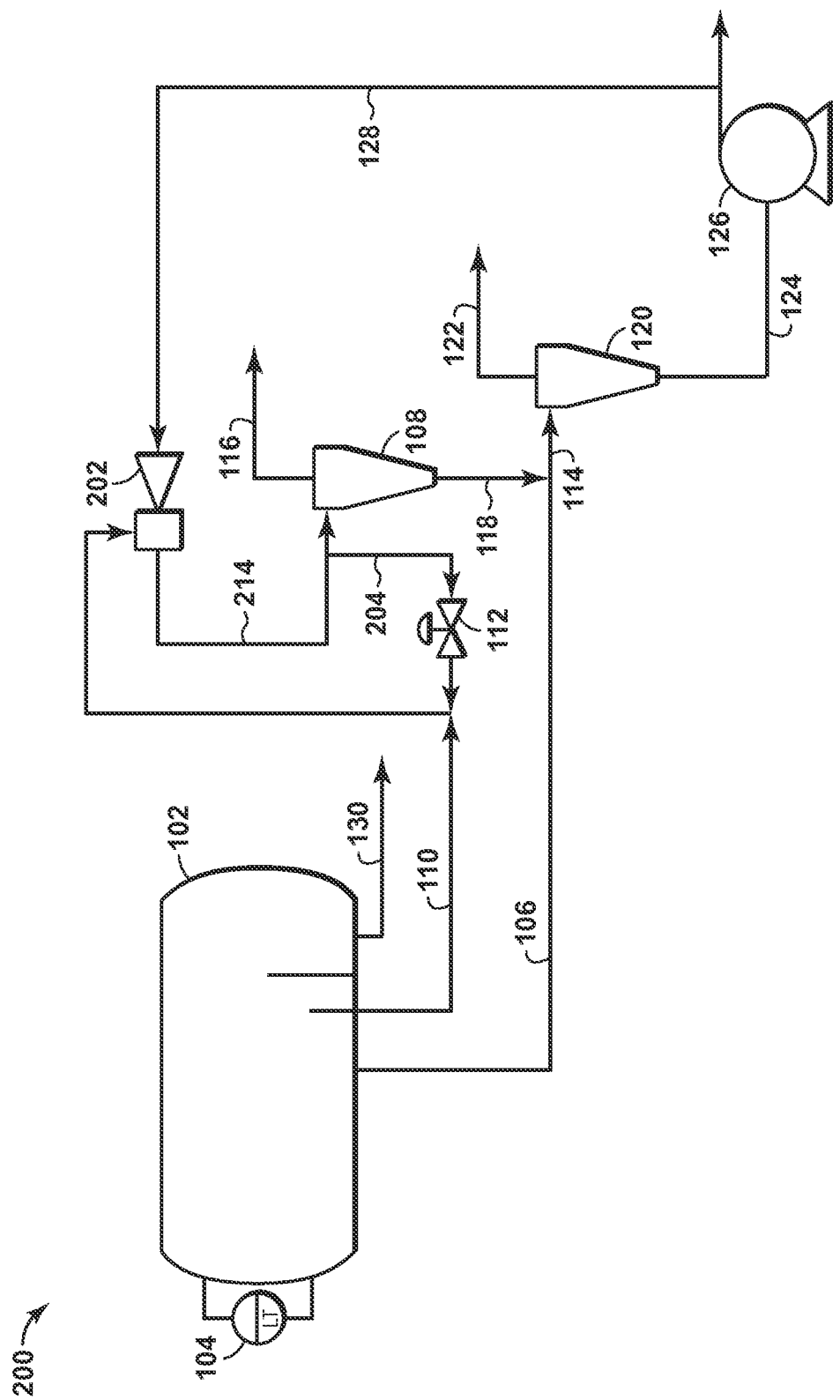
FIG. 2 is a schematic diagram of another embodiment of a system for emulsion extraction and processing from an oil/water separator.

FIG. 2 is a schematic diagram of another embodiment of a system 200 for emulsion extraction and processing from an oil/water separator 102. The components of FIG. 2 are substantially the same as the corresponding components in FIG. 1 unless stated otherwise. The system 200 comprises a jet pump 202, e.g., a liquid/liquid jet pump, configured to receive at least a portion of the emulsion flow from emulsion outlet line 110 and at least a portion of the discharge from the pump 126 via recycle line 128 and passing an output downstream to the first separation device 108 via leg 214. Leg 214 may be a mixing leg or preparation volume. The jet pump 202 may provide sufficient flow for efficient operation of the first separation device 108, for example, by diluting the emulsion with an effective quantity of water. The jet pump 202 may control the amount of emulsion being withdrawn from the separator 102 by adjusting the motive fluid (e.g., flow in recycle line 128), flow rate, and/or recycle loop from the jet pump's discharge (e.g., via return line 204) based upon the readings of the detector 104 (e.g., oil/water emulsion layer thickness and/or location). The system 100 comprises a return line 204 on which a control valve 112 is positioned or disposed. Those of skill will appreciate that in some embodiments the first separation device 108 may function as a bulk or first-stage separator and a second separation device 120 may function as a polishing separator.

In operation, the system 200 may determine and/or monitor an emulsion parameter in the separator 102 or a composition in an emulsion flow out of the separator, e.g., at the mixing leg or preparation volume 114, at the emulsion outlet, or along the emulsion outlet line 110. The system 100 may flow the emulsion stream or flow out of the separator and through the jet pump 202. The pump 126 discharge combines with the emulsion stream or flow to simultaneously dilute the composition in the received emulsion in the mixing leg or preparation volume 114 and increase the inlet pressure at the first separation device 108, which is coupled to the jet pump 202. A recirculation or return line 204 may receive at least a portion of the discharge of the jet pump 202. Operation of and/or dynamic control over the control valve 112 may be based at least in part on one or more system variables, e.g., the amount of flow sent to the first separation device 108, the dilution of the emulsion in the mixing leg or preparation volume 114, the amount of oil in the underflow reaching the second separation device 120, and/or the emulsion level in the separator 102. The first separation device 108 may separate the received stream into an underflow stream comprising substantially water and a reject stream comprising substantially oil. The water underflow stream exiting the first separation device 108 via the underflow stream outlet 118 may combine with a water stream or flow carried by the water outlet line 106 at a mixing leg or preparation volume 114 prior to entering the second separation device 120. The second separation device 120 separates the input emulsion into a second underflow stream comprising substantially water and a second reject stream comprising substantially oil. The second separation device 120 passes the second underflow stream to the pump 126 for discharge from the system 200.

Figure 3:
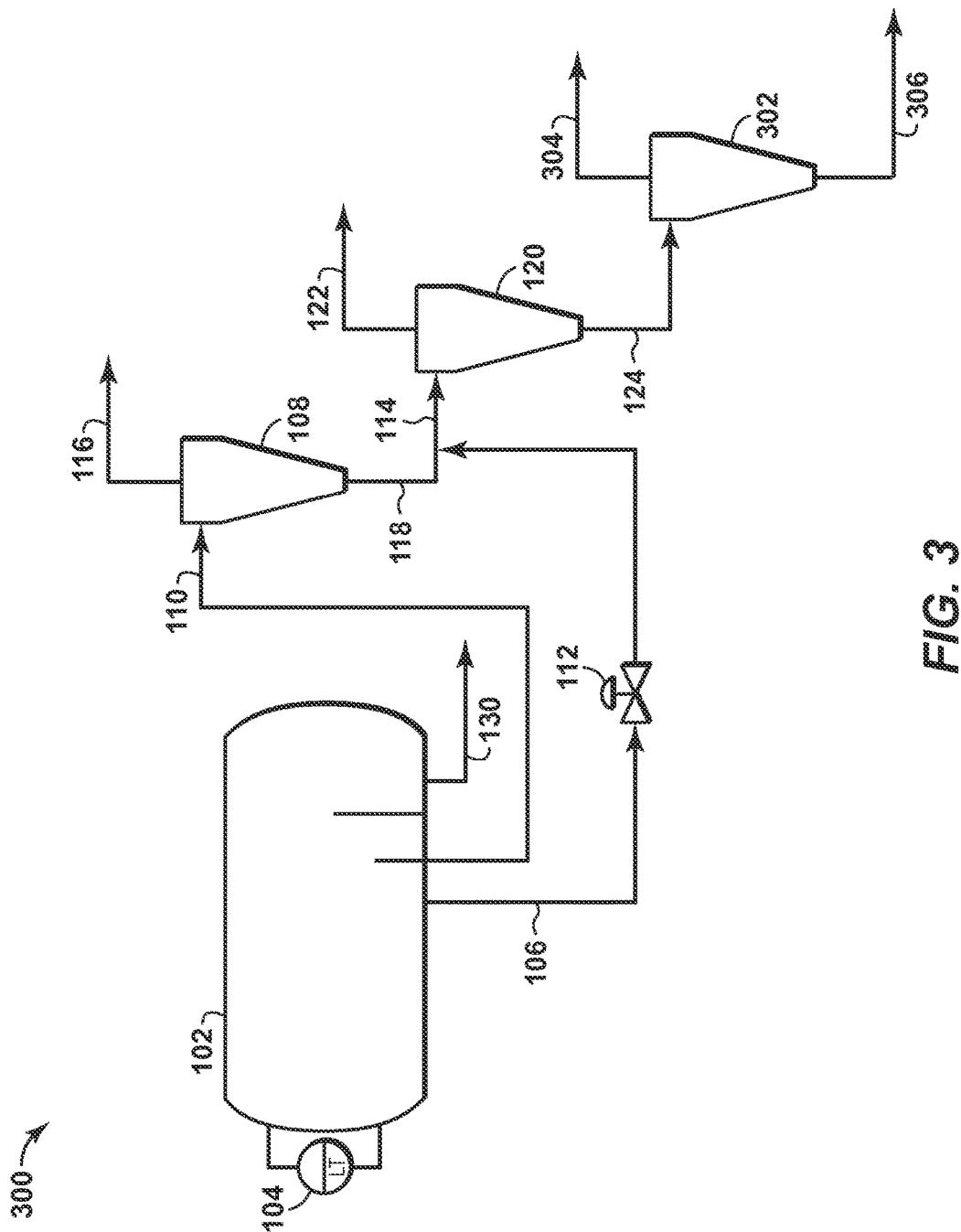
FIG. 3 is a schematic diagram of another embodiment of a system for emulsion extraction and processing from an oil/water separator.

FIG. 3 is a schematic diagram of another embodiment of a system 300 for emulsion extraction and processing from an oil/water separator 102. The components of FIG. 3 are substantially the same as the corresponding components in FIG. 1 unless stated otherwise. The system 300 places the control valve 112 on the water outlet line 106. In the system 300, the emulsion outlet line 110 carries an oil-continuous emulsion to the first separation device 108, e.g., a bulk dewatering hydrocyclone. At the mixing leg or preparation volume 114, an underflow stream from the first separation device 108 carried by the underflow stream outlet 118 joins with a substantially water stream or flow carried by the water outlet line 106. The combined stream from the mixing leg or preparation volume 114 enters the second separation device 120, e.g., a bulk deoiling hydrocyclone. The second separation device 120 has two outputs, a reject stream outlet 122, e.g., for passing a stream comprising substantially oil, and an underflow stream outlet 124, e.g., for passing a stream of underflow comprising substantially water. The underflow stream outlet 124 exiting the second separation device 120 is fed to a third separation device 302, e.g., a polishing hydrocyclone. The third separation device 302 has two outputs, a reject stream outlet 304, e.g., for passing a stream comprising substantially oil, and an underflow stream outlet 306, e.g., for passing a stream of underflow comprising substantially water. FIG. 3 depicts the third separation device 302 at the end of the system 300, but those of skill in the art will understand that (just as with FIGS. 1 and 2), the underflow stream outlet 306 from the third separation device 302 may optionally be fed to a pump, e.g., the pump 126.

In operation, the system 300 may determine and/or monitor an emulsion parameter in the separator 102 or a composition in an emulsion flow out of the separator, e.g., at the mixing leg or preparation volume 114, at the emulsion outlet, or along the emulsion outlet line 110. The system 300 may flow or pass the emulsion stream or flow out of the separator via the emulsion outlet line 110 to the first separation device 108, which may function as a bulk dewatering hydrocyclone. The first separation device 108 may separate the received stream into an underflow stream comprising substantially water and a reject stream comprising substantially oil. At the mixing leg or preparation volume 114, the underflow stream exiting the first separation device 108 via the underflow stream outlet 118 may combine with a water stream or flow carried by the water outlet line 106. As specified above, the system 300 places the control valve 112 on the water outlet line 106. Depending on the controlling parameter, e.g., emulsion or water level in the separator 102, emulsion flow composition, etc., the control valve 112 may dynamically adjust the dilution of the flow passing via the underflow stream outlet 118 by adding comparatively more or comparatively less of the water flow to the flow in the underflow stream outlet 118, e.g., based at least in part on data received from the detector 104. The prepared stream resulting from the combination of the underflow stream outlet 118 and water in the mixing leg or preparation volume 114 is passed to the second separation device 120 for further processing, namely, separating with the underflow stream into a second underflow stream comprising substantially water and a second reject stream comprising substantially oil. The second separation device 120 passes the second underflow stream to a third separation device 302, where the second underflow stream is processed to create a third reject stream and a third water underflow stream.

Figure 4:
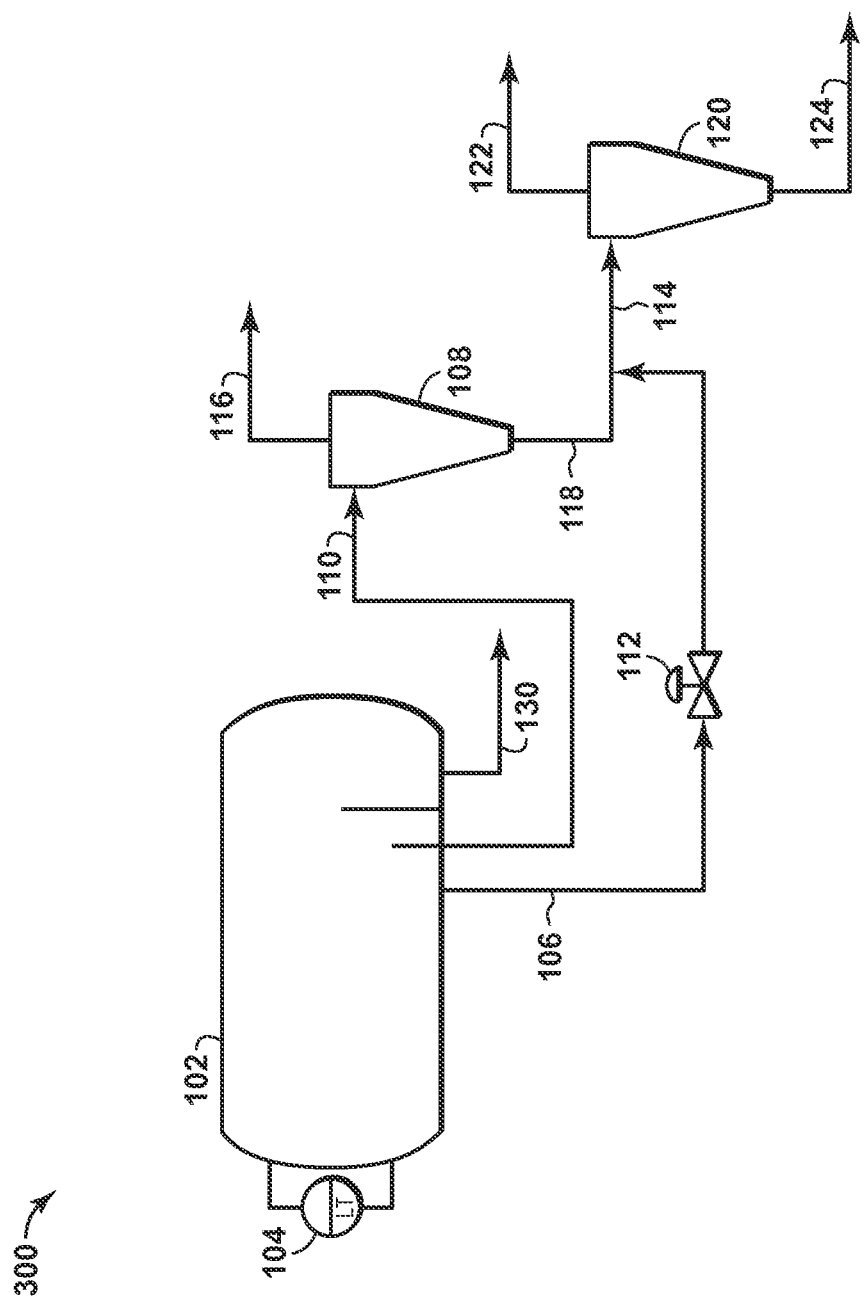
FIG. 4 is a schematic diagram of another embodiment of a system for emulsion extraction and processing from an oil/water separator.

FIG. 4 is a schematic diagram of another embodiment of a system 400 for emulsion extraction and processing from an oil/water separator 102. The components of FIG. 4 are substantially the same as the corresponding components in FIG. 3 unless stated otherwise. In the system 400, the emulsion outlet line 110 carries a water-continuous emulsion to the first separation device 108, e.g., a bulk deoiling hydrocyclone. As will be appreciated by those of skill in the art, the embodiments of FIGS. 3 and 4 may be particularly suitable for emulsions wherein their particular composition does not require dilution, e.g., oil-continuous and/or water-continuous emulsions.

In operation, the system 400 may determine and/or monitor an emulsion parameter in the separator 102 or a composition in an emulsion flow out of the separator, e.g., at the mixing leg or preparation volume 114, at the emulsion outlet, or along the emulsion outlet line 110. The system 400 may flow or pass the emulsion stream or flow out of the separator via the emulsion outlet line 110 to the first separation device 108, which may function as a bulk deoiling hydrocyclone. The first separation device 108 may separate the received stream into an underflow stream comprising substantially water and a reject stream comprising substantially oil. At the mixing leg or preparation volume 114, the underflow stream exiting the first separation device 108 via the underflow stream outlet 118 may combine with a water stream or flow carried by the water outlet line 106. As specified above, the system 400 places the control valve 112 on the water outlet line 106. Depending on the controlling parameter, e.g., emulsion or water level in the separator 102, emulsion flow composition, etc., the control valve 112 may dynamically adjust the dilution of the flow passing via the underflow stream outlet 118 by adding comparatively more or comparatively less of the water flow to the flow in the underflow stream outlet 118, e.g., based at least in part on data received from the detector 104. The prepared stream resulting from the combination of the underflow stream outlet 118 and water in the mixing leg or preparation volume 114 is passed to the second separation device 120 for further processing, namely, separating with the underflow stream into a second underflow stream comprising substantially water and a second reject stream comprising substantially oil.

Figure 5:
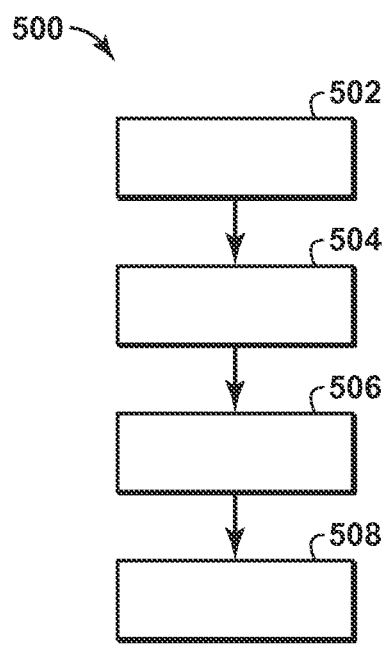
FIG. 5 is a block diagram for a process of emulsion extraction and processing from an oil/water separator.

FIG. 5 is a block diagram for a process 500 of emulsion extraction and processing from an oil/water separator system, e.g., any of the systems 100, 200, 300, and/or 400. The process 500 begins at block 502 with detecting with a detection instrument, e.g., the detector 104 of FIG. 1, an emulsion level in a separator, e.g., the separator 102 of FIG. 1, or a composition in an emulsion flow out of the separator e.g., at the mixing leg or preparation volume 114 of FIG. 1. At block 504, the process 500 may flow the emulsion flow out of the separator. At block 506, the process 500 may combine the emulsion stream with a water flow exiting the separator to create a diluted emulsion. A control valve, e.g., the control valve 112 of FIG. 1, can be used to dynamically adjust the dilution of the diluted emulsion by adding comparatively more or less of the water flow to the emulsion flow or vice versa. As explained further above, the control valve may be controlled at least in part based on data from the detection instrument. At block 508, the process 500 may proceed by separating with a hydrocyclone, e.g., the first separation device 108 of FIG. 1, the diluted emulsion into an underflow stream comprising substantially water and a reject stream comprising substantially oil. In some embodiments, the process 500 may continue by passing the underflow stream to a polishing hydrocyclone, e.g., the second separation device 120 of FIG. 1, where the polishing hydrocyclone may separate the underflow stream into a second underflow stream comprising substantially water and a second reject stream comprising substantially oil.

Figure 6:
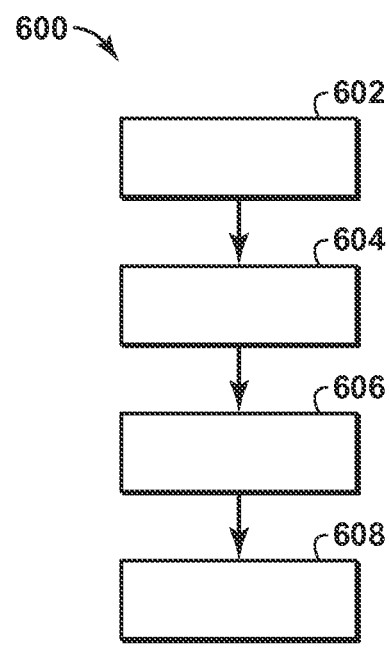
FIG. 6 is a block diagram for a process of emulsion extraction and processing from an oil/water separator.

FIG. 6 is a block diagram for a process 600 of emulsion extraction and processing from an oil/water separator, e.g., any of the systems 100, 200, 300, and/or 400. The process 600 begins at block 602 with detecting with a detection instrument, e.g., the detector 104 of FIG. 1, an emulsion level in a separator, e.g., the separator 102 of FIG. 1, or a composition in an emulsion flow out of the separator e.g., at the mixing leg or preparation volume 114 of FIG. 1. At block 604, the process 600 may flow the emulsion to a preparation volume to create a prepared emulsion flow. In some embodiments, creating a prepared emulsion flow comprises combining a water flow from the separator with an emulsion flow from the separator in a mixing leg or preparation volume, e.g., the mixing leg or preparation volume 114 of FIG. 1. In still other embodiments, creating a prepared emulsion flow comprises passing the emulsion flow through a liquid/liquid jet pump, e.g., the jet pump 202 of FIG. 2, and diluting the emulsion with at least a portion of the discharge from a pump, e.g., the pump 126 of FIG. 2. In still other embodiments, creating a prepared emulsion flow comprises separating the emulsion into a second reject stream and the prepared emulsion flow using the bulk deoiling hydrocyclone, e.g., the first separation device of FIG. 3. In other embodiments, creating a prepared emulsion flow comprises separating the emulsion into a second reject stream and the prepared emulsion flow using a bulk dewatering hydrocyclone, e.g., the first separation device of FIG. 4. At block 606, the process 600 continues by combining the prepared emulsion flow with a water flow to create a diluted emulsion. For example, the process 600 may dynamically adjust the dilution of the diluted emulsion using a control valve 10 to add comparatively more or less of the water flow to the emulsion flow or vice versa. In such systems, the control valve may be operated and/or controlled at least in part based on data from the detection instrument. At block 608, the process 600 may separate the diluted emulsion into a water underflow stream comprising substantially water and a reject stream comprising substantially oil using a hydrocyclone, e.g., the first separation device 108 of FIG. 1.

While the present techniques may be susceptible to various modifications and alternative forms, the exemplary embodiments discussed herein have been shown only by way of example. However, it should again be understood that the techniques disclosed herein are not intended to be limited to the particular embodiments disclosed. Indeed, the present techniques include all alternatives, modifications, combinations, permutations, and equivalents falling within the true spirit and scope of the appended claims.

The invention claimed is:

1. A method of emulsion extraction and processing from a subsea oil/water separator, comprising:
    detecting an emulsion level in the subsea oil/water separator, or detecting a composition of an emulsion stream leaving the subsea oil/water separator;
    combining the emulsion stream with a first portion of a liquid/liquid jet pump discharge stream to create a diluted emulsion;
    dynamically adjusting a dilution of the diluted emulsion by adding comparatively more or less of the first portion of the liquid/liquid jet pump discharge stream to the emulsion stream or vice versa, and wherein the dilution is controlled at least in part based on the emulsion level in the subsea oil/water separator or a composition of the emulsion stream;
    passing at least a portion of the diluted emulsion to the liquid/liquid jet pump;
    passing a recycle stream to the liquid/liquid jet pump;
    combining the recycle stream and the at least a portion of the diluted emulsion in the liquid/liquid jet pump to create the liquid/liquid jet pump discharge stream;
    separating a second portion of the liquid/liquid jet pump discharge stream into a water underflow stream comprising water and a reject stream comprising oil; and
    passing at least a portion of the water underflow stream to the liquid/liquid jet pump, as the recycle stream, via a recirculation line.

2. The method of claim 1, wherein the oil reject stream is a first oil reject stream and the water underflow stream is a first water underflow stream, and further comprising:
    separating the first water underflow stream into a second oil reject stream and a second water underflow stream, wherein a portion of the second water underflow stream comprises the recycle stream.

3. The method of claim 1, wherein the emulsion is an oil-continuous emulsion.

4. The method of claim 1, further comprising:
combining a water stream from the subsea oil/water separator with the water underflow stream.

* * * * *